Dec. 18, 1945.   E. D. TILLYER   2,391,045
OPHTHALMIC LENS
Filed Sept. 12, 1942   2 Sheets-Sheet 1
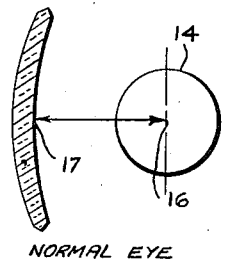
NORMAL EYE
Fig. I
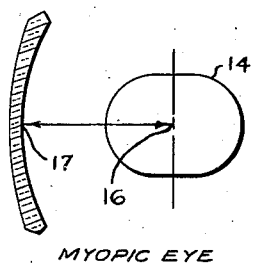
MYOPIC EYE
Fig. II
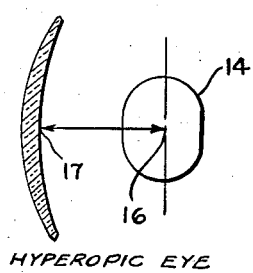
HYPEROPIC EYE
Fig. III
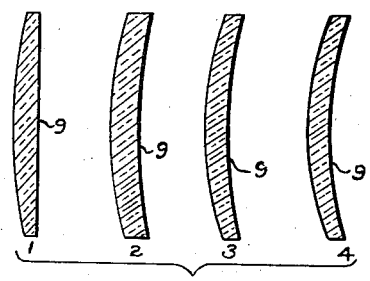
Fig. IV
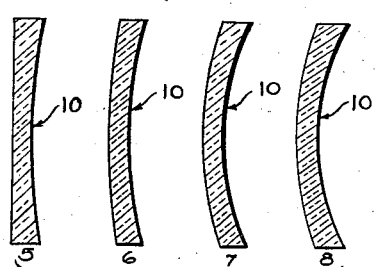
Fig. V
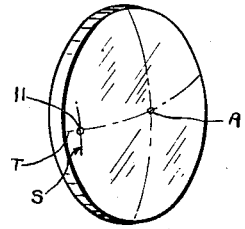
Fig. VI
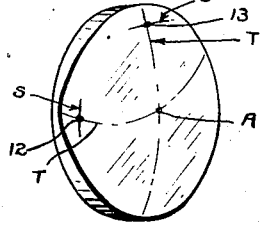
Fig. VII
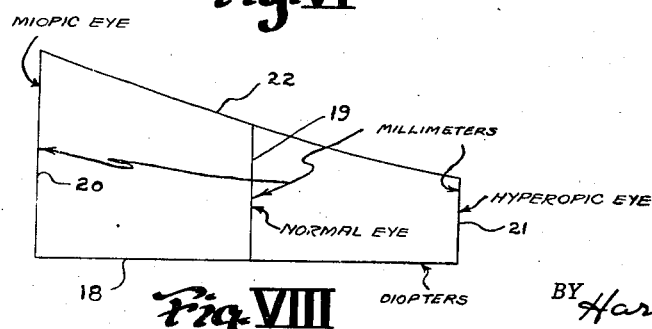
Fig. VIII
INVENTOR
EDGAR D. TILLYER
BY Harry H. Styll
ATTORNEY

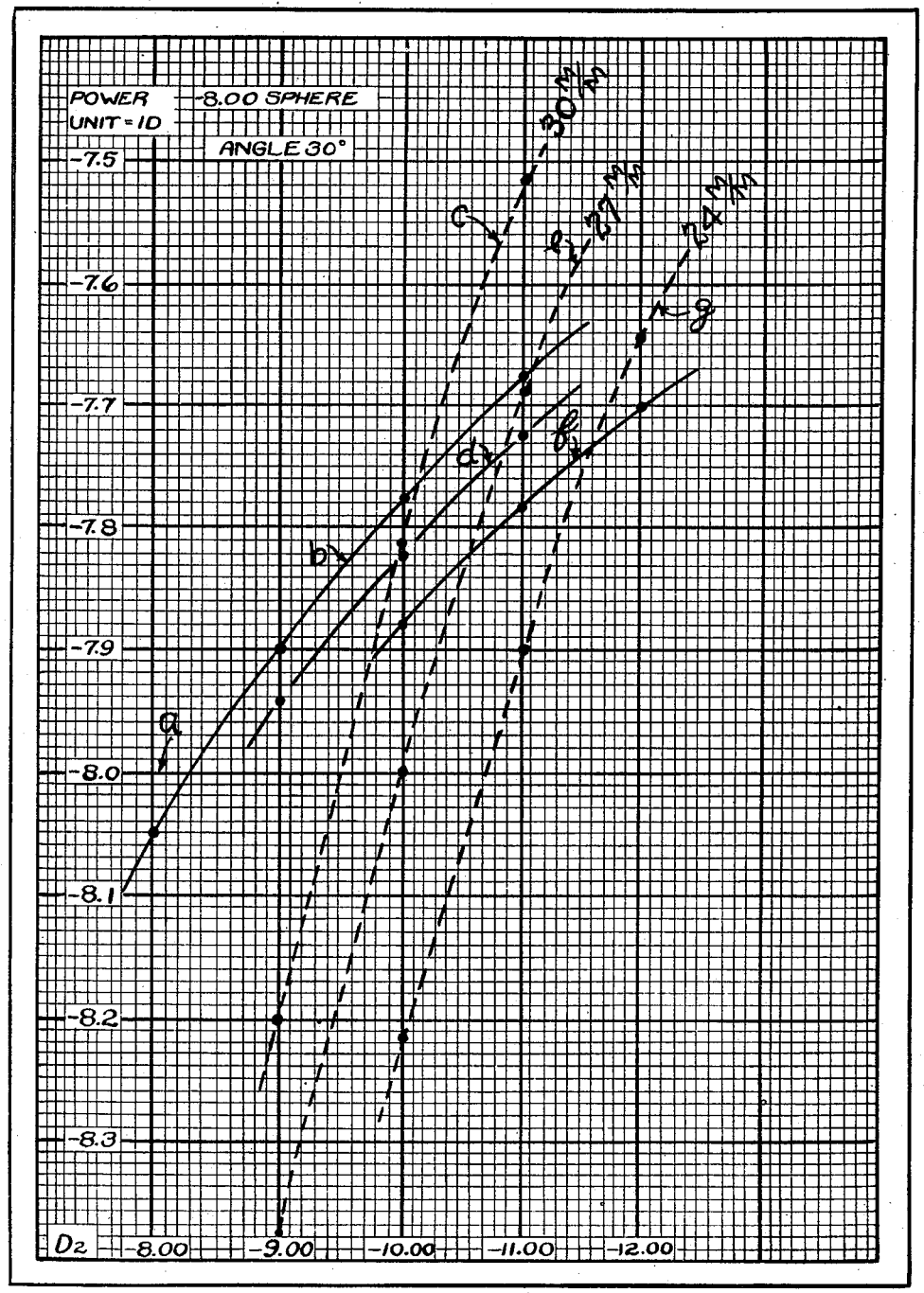
Fig IX

Patented Dec. 18, 1945

2,391,045

UNITED STATES PATENT OFFICE 2,391,045

OPHTHALMIC LENS

Edgar D. Tillyer, Southbridge, Mass., assignor to American Optical Company, Southbridge, Mass., a voluntary association of Massachusetts Application September 12, 1942, Serial No. 458,077

2 Claims. (Cl. 88—54)

This invention relates to improvements in ophthalmic lenses, and has particular reference to an improved construction of lens to reduce marginal or oblique errors to a minimum to obtain the best possible vision throughout the normal field of vision wherein the distance from the lens to the center of rotation of the eye before which it is used has been taken into account in the calculation and design of the lens, and to an improved method of producing said lenses. It further relates to an improved series of marginally compensated ophthalmic lenses and to an improved method of making the same.

The lenses of this invention are similar to those of my United States Letters Patent 1,588,559, patented June 15, 1926, with the exceptions hereinafter noted, and particularly with the addition of the compensation in the design and calculations of the lenses for the distance from the lens to the center of rotation of the eye before which the lens is used in cases where said distance is other than a constant for all eyes.

Such lenses may be compensated for marginal errors of astigmatism alone, or for marginal errors of focus alone, or for balanced marginal errors of both astigmatism and focus.

One of the leading objects of the invention is the making of an ophthalmic lens with a shape surface that will reduce to a minimum the marginal or oblique errors of astigmatism, or of focus, or of both astigmatism and focus, and compensated also for the distance from the lens to the center of rotation of the eye before which it is to be used, with a second surface to produce the required prescriptive power of the lens, said surface being of the spherical, plano, toric, cylindrical or aspherical type usual in lens manufacture.

Another object of the invention is the production of a series of ophthalmic lenses of several proximate powers, all of which will have the same shape surface and the selected oblique errors reduced within a permissible limit and which will also be compensated for the same distance from the lens to the center of rotation of the eye before which it is to be used.

Another object of the invention is the provision of a series of ophthalmic lenses with selected oblique errors reduced to a minimum permissible to good usage where several lenses of different powers, some proximate and others separated which will have the same shape surface on one side, and compensated for the same distance from the lens to the center of rotation of the eye before which it is to be used, and wherein the surfaces on the other sides are used for several different powers of lenses, thereby reducing the number of surfacing tools and equipment to a minimum, saving time, expense, investment and insuring prompt service and permitting the lenses to be sold if desired as blanks, that is, one side only finished, leaving the other side to be put on by the optician to fit individual prescription.

Another object of the invention is to produce such lenses and series of lenses with improved mean marginal errors of focus and astigmatism and compensated for the distance from the lens to the center of rotation of the eye before which it is to be used.

Another object of the invention is to provide means to determine the best possible shape surface to produce the smallest marginal errors and provide compensation for the distance of the lens from the center of rotation of the eye.

Another object of the invention is to provide graphic means whereby the marginal errors and best shape surfaces with compensation for the distance of the lens from the center of rotation of the eye may be readily visualized and determined for lenses throughout the whole practicable range of ophthalmic lenses.

Another object is to reduce the cost of production of such marginally corrected lenses compensated for the distance of the lens to the center of rotation of the eye, put them on a manufacturing basis and on a service basis parallel with the usual noncorrected prior art lenses and to produce the same with a minimum of equipment and tools.

Another object of the invention is to provide a plurality of series of marginally corrected lenses, each series being compensated for the distance of the lens to the center of rotation of the eye, said distance being the same for all units of the series, but different from that of the units of some of the other series.

Another object of the invention is to provide a series of marginally corrected series of lenses covering the usual range of powers with the element of the distance from the center of rotation of the eye to the lens varied according to the refractive power of the lens.

Other objects of the invention are to provide improved methods, processes and means of producing marginally corrected ophthalmic lenses compensated for the distance from the center of rotation of the eye to the lens, of providing a plurality of series of marginally corrected ophthalmic lenses wherein each unit of a series has been compensated for the same distance from the center of rotation of the eye to the lens, of providing lens blanks for each unit of a series finished on one side and compensated for marginal corrections and for the distance from the lens to the center of rotation of the eye so the lens blank may be finished to required prescriptive power by the optician by the use of regular standard lens surfaces on the unfinished side and of providing ophthalmic lenses compensated for marginal errors and for the distance from the lens to the center of rotation of the eye.

Other objects and advantages of the invention will be readily apparent from the following specifications taken in connection with the accompanying drawings, and it will be understood that modifications in, or departures from the specific features herein disclosed within the scope of the appended claims may be made without departing from or exceeding the invention, the preferred forms being shown only by way of illustration.

It has been found from experience that the length of the eyeball, from front to back, varies with the power of the refractive correction necessary. In general a myope has a longer eyeball than a normal person, and a hyperope has a shorter eyeball.

The greater the departure from normal the greater is the change in the length of the eyeball.

In the calculation of refractive ophthalmic lenses for oblique abberations or errors the distance from the lens to the center of rotation of the eye is an important element in the calculation of said lenses. Previously this distance has been assumed to be a constant for all powers of lenses. Obviously, in the case of a myope this distance is greater than for a normal eye, and in the case of a hyperope it is less.

It is therefore an important object of this invention to provide a series of lenses covering the usual range of powers with this element of the distance from the lens to the center of rotation of the eye taken into consideration in the calculation of the lenses, and this distance to be varied according to the refractive powers of the lenses. To accomplish this I have divided the said series of lenses covering the said range of powers into a number of groups, or sub-series, each group covering a definite range of powers and to have a single unit distance from the lens to the center of rotation of the eye depending on the powers of the lenses in that group.

The rotational distance now in general use is about 27 mm., which is the rotational distance of a normal eye when the lens is placed in the customary position in front of the eye. In this invention the said whole lens series is divided into groups of powers each group having its own rotational distance, that is, all lenses in that group will have the same rotational distance factor. The first group will extend from zero power to X power. This group will have a rotational distance factor of A. This being the range of the normal eye the rotational distance factor A will be about 27 mm. From X power to Y power there will be a different rotational distance factor B, and from Y power to Z power there will be yet another rotational distance factor C, and so on for all the groups covering the entire range of the ophthalmic series.

The rotational distance factors A, B, C, etc., are determined from physiological measurements of the eye.

The rotational distance factor does not obtain as far as the axial vision is concerned. It is of importance only in the case of oblique or marginal vision.

The flexure or shape of the lens depends upon the rotational distance factor and the lens of this invention is designed for a definite rotational distance for a given power of lens. Previous lens systems have assumed a constant rotational distance for all powers. While this is an approximation of required results, it is not exact, and in some cases may introduce considerable errors.

Respecting the position of the center of motion of the eye, numerous investigations have been made, among others, Volhmann, Mile, Burow, Valentin and Donders.

The eye does not differ much from a globe, and is in great part contained in a globular cavity. These observers agreed that the center of motion should be situated about the middle of the visual axis. It was shown that ametropia depends principally on a difference in length of the visual axis, hence the distance at which the center of motion lies behind the cornea, should, in ametropia undergo a modification.

In this invention the distance from the lens to the center of rotation of the eye is graded according to the powers of the lenses, for it has been found from investigation that the various types of human vision and human eyes follow closely the variation in power of the lenses required for correction, that is myopic eyes, of low myopia while longer than emmetropic eyes will be shorter than a myopic eye of higher myopia and in hyperopic eyes the higher degree of hyperopia the shorter the eyeball. I have grouped my units of rotational distance in accordance with this law.

Referring to the drawings:

Fig. I is a diagrammatic cross section showing the distance from the lens to the center of rotation of a normal eye;

Fig. II is a diagrammatic cross section showing the distance from the lens to the center of rotation of a myopic eye;

Fig. III is a diagrammatic cross section showing the distance of the lens from the center of rotation of a hyperopic eye;

Fig. IV is a diagrammatic illustration of four cross sections of different shapes of the same power of plus lenses numbered respectively 1, 2, 3 and 4;

Fig. V is a diagrammatic illustration of four cross sections of different shapes of the same power negative or minus lenses, numbered respectively, 5, 6, 7 and 8;

Fig. VI is a diagrammatic illustration of a spherical lens showing the axial power and a marginal point through which the oblique or marginal errors are computed;

Fig. VII is a diagrammatic illustration of a toric lens showing the axial power point and two marginal points in the major meridians through which the oblique or marginal errors are computed;

Fig. VIII is a graphic chart showing rotational distances for the range of the ophthalmic series;

Fig. IX is a diagrammatic chart showing the oblique tangential and sagital powers of a minus 8.00 diopter sphere at an angle of 30 degrees for varying base curves for centers of rotation distances of 30 mm., 27 mm., and 24 mm.

It is well known in the art that a lens of given power may have many different shapes, the power of the lens depending upon the relationship of the surfaces on the two sides and the refractive lens medium on which these surfaces are placed, as for example in Fig. IV, four diagrammatic views of lenses of the same power are shown, the lenses being plus or positive lenses. It will be noted that lens number 1 has one side plano and is flat in general appearance, while lens number 4 is very bulging. In Fig. V four negative or minus lenses of equal power are diagrammatically shown, number 5 having one side plano and having a flat appearance and number 8 being again very bulging.

It is also well known in the art that the power of a lens at its axis or central point is very different from the power in the marginal portions of the lens due to oblique errors of focus and astigmatism.

It is apparent from inspection of Figs. IV and V that one of the surfaces may be considered to dominate the shape of the lens, that is to say gives the lens its shape appearance. In Fig. IV the right hand surface 9 is the dominant one and in Fig. V the same condition obtains. Either surface may be used as the dominant surface as desired. The dominant surface I designate as the shape surface.

It is also well known that the marginal errors are greater in some shapes than in others. The important factor, therefore, is the provision of means to determine the best shape surface to reduce the marginal or oblique errors as they are termed, so that said errors both of focus and astigmatism, or either, may be reduced to best possible advantage obtainable in a lens of any desired power, keeping in mind at the same time the commercial production of the various powers of lenses so that the same shape surface may be used for as many different power lenses as possible within permissible limits of marginal error.

I first determine the center thickness of my lens in the manner well known in the art, working from a desired edge thickness for a positive lens and within the limits of mechanical strength necessary for a negative lens.

The normal angle of vision is generally considered to be 60 degrees, that is 30 degrees on each side of the axis.

Now comes the point wherein my present invention differs from the prior art. The surface of the lens on the eye side has hitherto been worn at a distance of about 27 millimeters from the center of rotation of the normal eye and the lenses for all powers have been calculated and produced for this distance. Actually they have been placed at a constant distance from the cornea for all powers. In the present invention this distance of 27 millimeters is used only for the normal eye. The lenses in this invention are calculated and made taking into account the actual distance from the center of rotation of the eye for the particular power of the eye being fitted. This has not been done in the case of prior art marginally corrected lenses.

My determinations therefore for marginal errors are taken at a point 30 degrees out from the axis of the lens, for a lens positioned at substantially the actual distance of the lens from the center of rotation of the eye instead of the standard distance of 27 millimeters previously used, as this distance of 27 millimeters is erroneous for all eyes except the normal.

Fig. VI shows one point 11 for a spherical lens and Fig. VII shows two points of determination, 12 and 13 for a toric lens, that is a lens having different curvatures in the two major meridians. The computations are made on two planes at right angles to each other at the marginal points, the plane marked S being termed in the art the sagital plane, and the plane marked T, the tangential plane, see Figs. VI and VII.

The procedure of the computation is the same as that set forth in my United States Patent 1,588,559, June 15, 1926, page 2, with the exception that instead of the distance 27 millimeters from the rear surface of the lens to the center of rotation of the eye where the principal oblique ray intersects the axis of the lens I use in my computation the actual distance from the lens to the center of rotation of the eye which is different from 27 millimeters except for cases of the normal eye. The results will therefore differ from those of my said patent by an amount influenced by the difference of the actual distance from the lens to the center of rotation of the eye from that of 27 millimeters. In some instances this difference is quite material and makes a decided change in the lens shape required. Otherwise the procedure is the same as that of my said patent which is incorporated herein where applicable.

The lenses may be computed from a graphic chart as in the case of the lenses of my said patent. The results however will be different in those cases where the distance from the lens to the center of rotation of the eye is different from 27 millimeters or the distance for the normal eye. The procedure of making the chart is that described in my said patent which disclosure is incorporated herein.

The limits of correction of my lenses in the ophthalmic series may be the same as those described in my said patent, that is the respective lenses are corrected within the limits of variation of the central powers of the ophthalmic series as set forth in my said patent. The marginal variations in my lenses are considerably under the variations in the ophthalmic series as described in my said patent where proximate lenses vary in central power from each other, that is to say, one-eighth diopter, one-quarter diopter, three-eighths diopter, one-half diopter and so on as the variations of the ophthalmic series are set up. Where the ophthalmic series of my said patent is used I correct within these limits.

Instead of the limits of variation of the ophthalmic series set up in my said patent I may, if I so desire, adopt other systems of variations in the range of the ophthalmic series, as for example I may vary the plus spheres by ⅛ diopters up to 3.75 diopters and then use ¼ diopter variations thereabove and in the minus spheres ⅛ diopter up to minus 3.25 and from there on by ¼ diopter steps. This series of variations is for many purposes more practical than the old ophthalmic series variations set forth in my said patent. The actual result as to correction is about the same but because of the smaller variations used as steps in this system the variation may in some instances exceed the limits of the central variation of proximate powers.

This however is immaterial, because they will still be below the limits of the old ophthalmic series, and the correction obtained will be the very best that can be obtained for a lens of that power because of my following the system of obtaining the shape surface for any particular lens that will give the best results as to marginal errors or variations from central power.

This invention applies to either system or to any system of variations that may be used as the shape surface is determined to give the best marginal corrections obtainable.

I have described above a system of making the lenses in a series of groups each group having a single definite rotational distance. It is clear also that instead of grouping the lenses in such groups I can modify any particular lens regardless of grouping, to fit the actual rotational distance for that lens. Either system can be used.

It is also clear that in cases where the variation of the rotational distance from normal is so slight as not to require any change that it will not be necessary to change those particular lenses at all in respect to the rotational distance.

The practical application of my invention is to change only those lenses wherein the rotational distance will require change because of an actual effect on vision making such a change advisable and necessary to best vision. This of course contemplates an analysis of all the lenses in the ophthalmic range and a correction for those where vision is improved to an extent of making the change advisable or necessary. In many of the lenses this change will be greatly beneficial.

In completing this analysis of the lenses of the ophthalmic range to find those units that need correction I lay off a graphic chart as shown in Fig. VIII. In making this chart I lay off the base line 18 to scale representing the range of the ophthalmic series. I then erect the vertical ordinate 19 at its proper place on the base line. This ordinate represents to scale the rotational distance of the normal eye, namely, 27 millimeters. Then I take a number of points on each side of 19, obtained from actual measurement of the rotational distance for a lens of that power. I have represented these by 20 and 21. The ordinate 20 is longer or greater than 19, and the ordinate 21 is shorter or less than 19. The number of these ordinates should be large enough to insure an accurate average rotational distance throughout the ophthalmic range. These points are obtained by actual measurement of the eyes. The greater number of points the more accurate the chart will be. After obtaining the ordinates in selected number I draw through them the line 22. Having completed this chart I can obtain visually the rotational distance at any place in the range by measuring from the line 18 to the line 22, and as stated above I can compensate any lens for this rotational distance or I may group the lenses in groups each having its own fixed rotational distance.

Under this procedure the rotational distance for any lens is readily apparent and may be compensated for if the change from normal is sufficient to be taken into account.

Under my invention all lenses requiring this compensation will be corrected and will produce results not obtainable in the prior art marginally corrected lenses.

The lenses of this invention are the same as those of my said patent with the exception of the compensation for the actual distance from the lens to the center of rotation of the eye and the disclosure of my said patent is applicable here with the said exception and the said disclosure is incorporated herein and made a part hereof.

Another difference and exception from my said patent is that I may make as described above the lenses of this invention in series, each series incorporating a given range of powers, and the units of each series all having compensation for the same distance from the lens to the center of rotation of the eye. This distance is different in each series if required.

As an example of the difference in power of a given lens when used at different distances from the center of rotation of the eye I have made an illustration in chart Fig. IX which I have fully described hereunder.

Referring to Fig. IX, the left hand vertical ordinates numbered minus 7.5 to minus 8.3 indicate the power of the tangential and sagital rays at an angle of 30 degrees with the axis for the center of rotation distances of 30 mm., 27 mm., and 24 mm., for the various ocular curves indicated in the lower horizontal scale extending from minus 8.00 to minus 12.00 diopters. All of the above is for a lens having an axial power of minus 8.00 diopters but with the varying shapes as indicated by the lower horizontal scale. The shape of the lens indicated by minus 8.00 diopters in the lower horizontal scale would be a plano concave, the shape indicated by minum 9.00 diopters would have approximately a plus 1.00 diopter on the front side and a minus 9.00 diopter curve on the ocular side and so on.

A base line $a$ is drawn at the minus 8.00 diopter vertical ordinate because this is the desired power for these lenses and any departure from this power is undesirable.

The line $b$ represents the sagital powers for an ocular rotation distance of 30 mm. for various ocular curves as represented by the abscissa at the bottom.

The line $c$ represents the tangential powers for the same conditions as $a$. The point of no oblique astigmatism is at the intersection of lines $b$ and $c$, which is where the base curve is slightly more than 10.1 diopters and the oblique power at this point is about minus 7.76 diopters as indicated by the vertical ordinates.

The lines $d$ and $e$ correspond to the lines $b$ and $c$ except that for the lines $d$ and $e$ the ocular rotation distance is 27 mm. The point of intersection for no astigmatism would have a base curve of approximately minus 10.8 diopters and the oblique power would be approximately minus 7.74 diopters.

The lines $f$ and $g$ give corresponding values for an ocular center rotation distance of 24 mm.

Suppose we had designed the lens to be free from astigmatism with a center of rotation of 27 mm. having a base curve of approximately minus 10.8 diopters or at the intersection of $d$ and $e$, then use this lens with a center of rotation distance of 30 mm., we would have a sagital power of minus 7.69 diopters and a tangential power of almost minus 7.57 diopters which would be a much poorer lens.

This is approximately what would happen with a series of lenses designed for a center of rotation distance of 27 mm. and intended to be placed at 13¾ mm. from the cornea when used on an elongated eyeball of the myope requiring a minus 8.00 diopter power. The displacement of 3 mm. in the center of rotation distance is not exactly the difference in the center of rotation distance that would occur but is used as an illustration of the type of phenomena that occurs, and any other values can be obtained by interpolating between the curves.

In the above I have taken the point of no astigmatism but prefer to use slightly flatter lenses and have less difference between the mean of the oblique power and the axial power as explained in my patent referred to above.

The data for the center of rotation distance of 24 mm. is used only for interpolation purposes in the high myopic range, but is used for the hyperopic in a corresponding way.

From the above it is seen that a lens of minus 8.00 diopter axial power that is corrected for no astigmatism at a center of rotation distance of 27 mm. has an oblique power of minus 7.74 diopters when used at a rotation distance of 30 mm. would have a tangential oblique power of minus 7.57 diopters a sagital oblique power of approximately minus 7.69 diopters which gives this lens at that point an effective astigmatism of the difference between these two, which is 0.12 of a diopter whereas for a center of rotation distance of 27 mm. the figure is zero or nothing.

The dots or points on the curves of Fig. IX and through which the curves pass are trigonometrically computed just as in the charts of my patent previously referred to, and the scaling and opertion of the chart is the same as that of the chart of my said patent to obtain the sagital and tangential reading of powers; with the addition of data for the 30 mm. and 24 mm. rotation distances.

Referring to Fig. I it will be seen that the eyeball 14 is circular in outline. This is the normal eye and the distance from 16, the center of rotation of the eye to 17, the rear surface of the lens will be 27 millimeters. The eyeball 14 in Fig. II is flattened down and is longer from front to back than is the normal eye. This is a myopic eye and the distance from 16 to 17 is greater than 27 millimeters. The eyeball 14 in Fig. III is flattened out from front to back and this distance from 16 to 17 is less than 27 millimeters. This is an hyperopic eye.

As these variations in the length of the eyeball seem to vary in accordance with the powers of the lenses, I have laid out my lens series where I use that system in as few groups as possible. It is believed that a series of four or five groups, that is the use of four or five different distances from the lens to the center of rotation of the eye will cover the practical range of ophthalmic prescription.

With the use of my invention the patient in a great many instances will have his lenses compensated for his own rotational distance and except in normal cases will receive a degree of correction in the marginal field not hitherto obtained.

The procedures of computation, the methods of production of the lenses, and the methods and processes used here are the same as those of my said patent, and the lenses may be produced and dispensed in the same way. Marginal astigmatism alone or marginal focus or both marginal astigmatism and focus may be corrected as in my said patent. The main differences of the present invention from my said patent are two in number, first, compensating the lens for the actual rotational distance and secondly, producing them in series, each group having the same rotational distance. These changes mark an important optical contribution and the obtaining of an accuracy beyond that hitherto reached.

From the foregoing it will be seen that I have provided simple, efficient and economical means for obtaining all the objects and advantages of the invention.

Having described my invention what I claim as new is:

1. A series of lens blanks for ophthalmic lenses of adjacent powers embodying corrections for myopic and hyperopic eyes ranging from given maximum myopic to given maximum hyperopic corrections and having their errors of marginal astigmatism and power reduced substantially to a minimum, said series embodying several groups of lens blanks formed of lens medium of a given index of refraction and each blank of a respective group having the same base curve, the base curves of the different groups within said series being arranged in graded sequence with the base curve of each group having as an element of its computation the distance of the center of rotation of the eye from said base curve when the resultant lens is in required position of use before the eye, said center of rotation distance for each group being substantially the average of the different center of rotation distances of the particular group of eyes to be corrected through the use of the lens blanks of said group with the center of rotation distance of the blanks employed in the correcting of myopic eyes being greater than the normal center of rotation distance and with the center of rotation distance of the blanks employed in the correcting of hyperopic eyes being less than the normal center of rotation distance, the curvature of each base curve in each instance being so controlled that, when combined with the desired thickness of lens medium for each lens and with the required prescriptive curves for producing the desired corrective optical powers, the errors of marginal astigmatism and power of the resultant lenses of said respective groups will be reduced substantially to a minimum.

2. A series of lenses of adjacent powers embodying corrections for myopic and hyperopic eyes ranging from given maximum myopic to given maximum hyperopic corrections and having their errors of marginal astigmatism and power reduced substantially to a minimum, said series embodying several groups of lenses formed of lens medium of a given index of refraction and each lens of a respective group having the same base curve, the base curves of the different groups within said series being arranged in graded sequence with the base curve of each group having as an element of its computation the distance of the center of rotation of the eye from said base curve when the lens is in required position of use before the eye, said center of rotation distance for each group being substantially the average of the different center of rotation distances of the particular group of eyes to be corrected by the lenses of said group with the center of rotation distance employed in the lenses for correcting myopic eyes being greater than the normal center of rotation distance and with the center of rotation distance employed in the lenses for correcting hyperopic eyes being less than the normal center of rotation distance, the curvature of each base curve in each instance being so controlled that when combined with the required thickness of lens medium for each lens the errors of marginal astigmatism and power of said respective groups will be reduced substantially to a minimum.

EDGAR D. TILLYER.